United States Patent [19]
Brobst et al.

[11] Patent Number: 5,893,106
[45] Date of Patent: Apr. 6, 1999

[54] OBJECT ORIENTED SERVER PROCESS FRAMEWORK WITH INTERDEPENDENT-OBJECT CREATION

[75] Inventors: Curtis Howard Brobst; Wayne Allen Nelson, both of Rochester, Minn.

[73] Assignee: International Business Machines Corporation, Armonk, N.Y.

[21] Appl. No.: 893,790

[22] Filed: Jul. 11, 1997

[51] Int. Cl.⁶ ........................................................ G06F 9/40
[52] U.S. Cl. .................... 707/102; 707/103; 395/200.33; 395/683
[58] Field of Search .............................. 395/200.33, 683; 707/102, 103

[56] References Cited

U.S. PATENT DOCUMENTS

| | | |
|---|---|---|
| 4,943,932 | 7/1990 | Lark et al. . |
| 5,057,996 | 10/1991 | Cutler et al. . |
| 5,101,364 | 3/1992 | Davenport et al. . |
| 5,119,475 | 6/1992 | Smith et al. . |
| 5,181,162 | 1/1993 | Smith et al. . |
| 5,195,172 | 3/1993 | Elad et al. . |
| 5,226,161 | 7/1993 | Khoyi et al. . |
| 5,247,693 | 9/1993 | Bristol . |
| 5,249,270 | 9/1993 | Stewart et al. . |
| 5,257,384 | 10/1993 | Farrand et al. . |
| 5,261,080 | 11/1993 | Khoyi et al. . |
| 5,274,572 | 12/1993 | O'Neill et al. . |
| 5,276,775 | 1/1994 | Meng . |
| 5,287,447 | 2/1994 | Miller et al. . |
| 5,293,470 | 3/1994 | Birch et al. . |
| 5,297,283 | 3/1994 | Kelly, Jr. et al. . |
| 5,315,703 | 5/1994 | Matheny et al. . |
| 5,367,633 | 11/1994 | Matheny et al. . |
| 5,369,766 | 11/1994 | Nakano et al. . |
| 5,379,430 | 1/1995 | Nguyen . |
| 5,388,264 | 2/1995 | Tobias, II et al. . |
| 5,390,325 | 2/1995 | Miller . |
| 5,396,626 | 3/1995 | Nguyen . |
| 5,398,336 | 3/1995 | Tantry et al. . |
| 5,446,842 | 8/1995 | Schaeffer et al. .................. 395/200.35 |
| 5,574,915 | 11/1996 | Lemon et al. ............................ 395/561 |
| 5,634,124 | 5/1997 | Khoyi et al. ............................. 395/614 |
| 5,680,619 | 10/1997 | Gudmundson et al. ................. 395/701 |
| 5,687,373 | 11/1997 | Holmes et al. .......................... 395/682 |
| 5,732,261 | 3/1998 | Savitzley et al. ........................ 395/614 |
| 5,809,507 | 9/1998 | Cavanaugh, III ........................ 707/103 |

OTHER PUBLICATIONS

Text of *IBM Technical Disclosure Bulletin*, vol. 37, DeBinder et al., Feb. 1994, "Results Folder Framework", pp. 431–432.

Text of *IBM Technical Disclosure Bulletin*, vol. 36, Coskun, N., Jun. 1993, "Persistent Framework Independent Record/Playback Framework", pp. 261–264.

Text of *IBM Technical Disclosure Bulletin*, Baker et al., Oct. 1991, "Model View Schema", pp. 321–322.

Text of *IBM Technical Disclosure Bulletin*, Baker et al., Oct. 1991, "Office Container Class", pp. 309–310.

Text of *IBM Technical Disclosure Bulletin*, Cavendish et al., Jul. 1991, "Icon Pane Class", pp. 118–119.

Text of *IBM Technical Disclosure Bulletin*, Baker et al., Jun. 1991, "Distribution List Class", p. 159.

(List continued on next page.)

*Primary Examiner*—Krisna Lim
*Attorney, Agent, or Firm*—David A. Hall

[57] ABSTRACT

An object oriented framework provides a set of objects that perform computer system server functions and that permit a framework user to add extensions for specific processing features, thereby producing a server program for managing computer system resources and performing desired functions. The framework includes a Server class of objects, which provides the server environment in which the objects performing server functions exist and serves as the primary interface between the server and the client machines, and includes a Service Object (SO) category of classes, whose objects comprise server function objects and implement two methods, one method called runMeFirst( ) and another method called runMeSecond( ) such that the runMeFirst( ) method is executed before the runMeSecond( ) method and interdependencies are resolved.

32 Claims, 9 Drawing Sheets

OTHER PUBLICATIONS

Text of *IBM Technical Disclosure Bulletin,* Cavendish et al., Jun. 1991, "Object–Oriented Documentation Tool", pp. 50–51.

Text of *IBM Technical Disclosure Bulletin,* Allard et al., Feb. 1990, "Object–Oriented Programming in C — the Linnaeus System", pp. 437–439.

Text of *IBM Technical Disclosure Bulletin,* vol. 38, No. 1, Jan. 1995, pp. 411–414, J. Knapman "Generating Specific Server Programs in Distributed Object–Oriented Customer Information Control System".

Text of *IBM Technical Disclosure Bulletin,* vol. 37, No. 12, Dec. 1994, pp. 19–20, Al–Karmi et al., "Events Set for Event Tracing in Distributed Object–Oriented Systems".

Text of *IBM Technical Disclosure Bulletin,* vol. 37, No. 12, Dec. 1994, pp. 375–378, Acker et al., "Automatically Generating Formatted Documentation for Object–Oriented Class Libraries".

Text of *IBM Technical Disclosure Bulletin,* vol. 37, No. 11, Nov. 1994, pp.71–72, Behrs et al., "Device Support Framework to Support ISO DPA 10175 and POSIX 1387.4".

Text of *IBM Technical Disclosure Bulletin,* vol. 37, No. 7, Jul. 1994, pp. 145–146. Banda et al., "Exception Management Algorithm for Multi–Threaded Method Invocation".

Text of *IBM Technical Disclosure Bulletin,* vol. 37, No. 6B, Jun. 1994, pp. 553–556, Gest et al., "Portable Object–Oriented Event Manager".

Abstract for WIPO Patent Application No. WO 95/04966, F.T. Nguyen, Feb. 16, 1995, "Automatic Management of Components in Object–Oriented System".

Abstract for U.S. Patent No. 5,388,264, Milne et al., Feb. 7, 1995, "Object–Oriented Framework System for Enabling Multimedia Presentations with Routing and Editing of MIDI Information".

Abstract for WIPO Patent Application No. WO 94/23364, Heninger et al., Oct. 13, 1994, "Framework Processing Apparatus for Application Software".

Abstract for U.S. Patent No. 5,369,766, Heninger et al., Nov. 29, 1994, "Object–Oriented Application Processing Apparatus".

Abstract from WIPO Patent Application No. WO 9422081, Sep. 29, 1994, "Hardware–Independent Interface for Interrupt Processing", G.O. Norman et al.

Abstract for WIPO Patent Application No. 94/19752, Anderson et al., Sep. 1, 1994, "Concurrent Framework Processing Apparatus For Two or More Users".

Abstract for WIPO Patent Application No. 94/19751, Anderson et al., Sep. 1, 1994, "Concurrent Framework Processing Apparatus For Application Users".

Abstract for WIPO Patent Application No. 94/19740, Goldsmith et al., Sep. 1, 1994, "Framework Processor of Object–Oriented Application".

Abstract for WIPO Patent Application No. 94/15286, Goldsmith et al., Jul. 7, 1994, "Object–Oriented Framework for Object Operating System".

Abstract for WIPO Patent Application No. 94/15282, Anderson et al., Jul. 7, 1994, "Dialog System Object–Oriented System Software Platform".

Abstract for WIPO Patent Application No. 94/15281, Anderson et al., Jul. 7, 1994, "Atomic Command Object–Oriented System Software Platform".

Abstract for WIPO Patent Application No. WO 9415285, Jul. 7, 1994, "Object–Oriented Notification Framework System", D.R. Anderson et al.

Abstract for U.S. Patent No. 5,119,475, Schoen et al., Jun. 2, 1992, "Object–Oriented Framework for Menu Definition".

Abstract No. 95–091003/12, "Flexible Multi–Platform Partitioning for Computer Applications in Object Oriented System".

Abstract for WIPO Patent Application No. 95/01610, Koko et al., Jan. 12, 1995, "Object Oriented Product Structure Management in Computer–Aided Product Design".

Abstract for WIPO Patent Application No. 95/04967, Feb. 16, 1995, "Access Method to Data Held in Primary Memory Based Data Base".

Abstract for WIPO Patent Application No. 95/02219, Helgeson et al., Jan. 19, 1995, "Distributed Computation Based on Movement, Execution and Insertion of Processes in Network".

Abstract from U.S. Patent No. 5,371,891, "Object Constructions in Compiler in Object Oriented Programming Language", J. Gray et al., Dec. 6, 1994.

Abstract from EPO Patent Application No. EP 622730, "Encapsulation of Extracted Portions of Documents Into Objects", M.A. Malamud, Nov. 2, 1994.

Abstract for EPO Patent No. 619544, S. Danforth, Oct. 12, 1994, "Language–Neutral Object–Oriented Programming".

Abstract for WIPO Patent No. 94/20912, Sep. 15, 1994, "Object–Oriented System for Managing Financial Instruments".

Inspec Abstract No. C9504–7460–043, Sells et al., 1995, "Implementation of the Architecture for a Time–Domain Dynamical System Simulation in a Very High–Level Pictorial Object–Oriented".

Inspec Abstract No. C9504–7460–042, Coleman et al., 1995, "An End–To–End Simulation of A Surveillance System Employing Architecture Independence, Variable Fidelity Components and Software Reuse".

Inspec Abstract No. C9503–61400–045, Satoh et al., 1995, "Process Algebra Semantics for a Real Time Object Oriented Programming Language".

Inspec Abstract No. C9501–7160–020, C. Le Pape, 1993, "The Cost of Genericity: Experiments With Constraint–Based Representations of Time–Tables".

Inspec Abstract No. C9501–6140D005, S. Vinoski, 1994, "Mapping CORBA IDL Into C++".

Inspec Abstract No. C9501–7330–007, Salminen et al., 1994, "Modelling Trees Using an Object–Oriented Scheme".

Inspec Abstract No. C9412–6110B–221, Berghel et al., 1992, "A Generic Object–Oriented Concurrency Mechanism for Extensibility and Reuse of Sychronization Components".

Inspec Abstract No. B9412–6210Q–016, from Qingzhong et al., 1992, "An Object–Oriented Model for Intelligent Networks".

Inspec Abstract No. C9412–7810–003, from Jung et al., 1993, "Development of an Object–Oriented Anthropometric Database for an Ergonomic Man Model".

Inspec Abstract No. C9412–6110J–014 from Griss et al., 1994, "Object–Oriented Reuse".

Inspec Abstract No. C9411–6130B–108, from Mili et al., 1992, "Building a Graphical Interface for a Reuse–Oriented CASE Tool".

Inspec Abstract No. C9411–7100–029 from C. Le Pape. 1994, "Implementation of Resource Constraints in ILOG Schedule: A Library for the Development of Constraint–Based Scheduling Systems".

Inspec Abstract No. C9411–6115–035 from Mili et al., 1991, "Softclass: An Object–Oriented Tool for Software–Reuse".

Inspec Abstract No. C9410–6180G–015, from Eichelberg et al., 1993, "Integrating Interactive 3D–Graphics into an Object–Oriented Application Framework".

Inspec Abstract No. B9409–6210M–025, from Hellemans et al., 1994, "An Object–Oriented Approach to Dynamic Service Descriptions".

Inspec Abstract No. C9409–6180–059, from Wang et al., 1993, "A Framework for User Customization".

Inspec Abstract No. C9408–6110B–016, from Chen et al., 1994, "An Experimental Study of Using Reusable Software Design Frameworks to Achieve Software Reuse".

Inspec Abstract No. C9408–7420–021, from Pirklbauer et al., 1994, "Object–Oriented Process Control Software".

Inspec Abstract No. C9408–6110J–011 from Gyu–Chung et al., 1993, "System Methodologies of Object–Oriented Programs".

Inspec Abstract No. C9407–7420D–045, from Desai et al., 1994, "Controller Structure Definition Via Intelligent Process Control".

Inspec Abstract No. C9407–6140D–014, from Satoh et al., 1994, "Semantics for a Real–Time Object–Oriented Programming Language".

Inspec Abstract No. C9406–6150N–015, from Schmidt et al., 1994, "The Service Configurator Framework: An Extensible Architecture for Dynamically Configuring Concurrent, Multi–Service Network Daemons".

Inspec Abstract No. C9405–6180G–031, from Woyak et al., 1993, "A Motif–Like Object–Oriented Interface Framework Using PHIGS".

Inspec Abstract No. C9403–6180–027, 1991, "An Event–Object Recovery Model for Object–Oriented User Interfaces" from Proceedings of ACMSymposium on User Interface Software & Technology.

Inspec Abstract No. C9504–6130B–049, from A. van Dam, 1995, "VR as a Forcing Function: Software Implications of a New Paradigm".

Inspec Abstract No. C9504–6140D–024, from Sheffler et al., "An Object–Oriented Approach to Nested Data Parallelism".

Inspec Abstract No. C9503–6110B–045, from Rosiene et al., 1995, "A Data Modeling Framework for Queueing Network Models".

Inspec Abstract No. B9503–8110B–023, from Mautref et al., 1995, "An Object–Oriented Framework for the Development of Interactive Decision Support Systems".

Inspec Abstract No. C9502–7160–026, from Menga et al., 1995, "An Object–Oriented Framework for Enterprise Modelling".

Inspec Abstract No. C9502–6130G–006, "Support for Enterprise Modelling in CSCW", P. Hennessy et al., 1994.

Inspec Abstract No. C9502–7810C–058, from Lin et al., 1995, "Can CAL Software Be More Like Computer Games?".

Inspec Abstract No. C9501–6115–039, from Elia et al., 1993, "G++: An Object Oriented Environment for Developing Distributed Applications".

Inspec Abstract No. C9412–7330–186 from Righter et al., 1994, "An Object–Oriented Characterization of Spatial Ecosystem Information".

Inspec Abstract No. C9412–6160J–025, from J. Iivari, 1994, "Object–Oriented Information System Analysis: A Comparison of Six Object–Oriented Analysis Methods".

Inspec Abstract No. C9412–6110J–006, from Lau et al., 1993, "Using SOM for Tool Integration".

Inspec Abstract No. C9411–6160J–011, from Odberg et al., 1992, "A Framework for Managing Schema Versioning in Object–Oriented Databases".

Inspec Abstract No. C9406–7490–012, "A Discrete–Event Object–Oriented Modeling Environment for Sawmill Simulation".

Inspec Abstract No. C9406–6115–048, 1993, "Constructing Multi–View Editing Environment Using MViews".

Inspec Abstract No. 4664213, "Maintaining Information about Persistent Replicated Objects in a Distributed System"., 1993 IEEE Conference on Distributed Computing Systems.

Inspec Abstract No. C9406–6110J–029, "A Comparison of Object–Oriented Analysis and Design Methods", Proceedings of C++ World 1993.

Inspec Abstract No. C9406–0310F–011, 1993, "Cost–Benefit Analysis of Object–Oriented Technology".

Inspec Abstract No. C9406–6110J–007, from J.D. Grimes, 1993, "Objects 101–An Implementation View", Proceedings of C++ World 1993.

Inspec Abstract No. 4647921, from Uhorchak et al., 1993, "An Object–Oriented Class Library for Creating Engineering Graphs Using PHIGS".

Inspec Abstract No. 4642214, from Marshall et al., 1992, "Using VDM Within an Object–Oriented Framework".

Inspec Abstract No. 4626386, from Arora et al., 1993, "Building Diverse Environments with PCTE Workbench".

Inspec Abstract No. 4622794, from Campbell et al., 1993, "A Technique for Documenting the Framework of an Object–Oriented System".

Inspec Abstract No. 4618974, from Bowers, 1993, "Some Principles for the Encapsulation of the Behaviour of Aggregate Objects".

Inspec Abstract No. 4616931, from, Islam et al., 1993, "Uniform Co–Scheduling Using Object–Oriented Design Techniques".

Inspec Abstract No. 4613481, from Thieme et al., 1993, "Schema Integration in Object–Oriented Databases".

Inspec Abstract No. 4603430, from G. Booch, 1994, "Designing an Application Framework".

Inspec Abstract No. 4596323, from Frank et al., 1993, "An Integrated Environment for Designing Object–Oriented Enterprise Models".

Inspec Abstract No. 4593721, Periyasamy et al., 1993, "A Formal Framework for Design and Verification of Robotic Agents".

Inspec Abstract No. 4588839, from L. Fisher, 1992, "Constructing a Class Library for Microsoft Windows".

Inspec Abstract No. 4588834, from G. Olander, 1992, "Chembench: Redesign of a Large Commercial Application Using Object–Oriented Techniques".

Inspec Abstract No. 4566447, from J. Rossazza, 1992, "An Object–Centered Fuzzy Representation".

Inspec Abstract No. 4565630, from Karpovich et al., 1993, "A Parallel Object–Oriented Framework for Stencil Algorithms".

Inspec Abstract No. C9402–6150G–002, from Bruegge et al., 1993, "A Framework for Dynamic Program Analyzers".

Inspec Abstract No. 4550414, from Parrish et al., 1993, "Automated Flow Graph–Based Testing of Object–Oriented Software Modules".

Inspec Abstract No. 4540729, from Bailers et al., "The ecology of Class Refinement".

Inspec Abstract No. 4534334, from Campbell et al., 1991, "A Technique for Documenting the Framework of an Object–Oriented System".

Inspec Abstract No. 4534330, from Istavrinos et al., 1992, "Experiences with an Object–Oriented Mapper for Coherent Distributed Shared Memory".

Inspec Abstract No. 4528985, from Beneventano et al., 1993, "Taxonomic Reasoning with Cycles in LOGIDATA+".

Inspec Abstract No. 4525743, from Hakimzadeh et al., 1993, "Instance Variable Access Locking for Object–Oriented Databases".

Inspec Abstract No. 4512593, from H. Sakai, 1993, "A Method for Contract Design and Delegation in Object Behavior Modeling".

Inspec Abstract No. B9310–6210L–099, "Templates, Types and Classes in Open Distributed Processing", 1993.

Inspec Abstract No. 4459325, from Kesim et al., 1992, "On the Evolution of Objects in a Logic Programming Framework".

Inspec Abstract No. 4447153, from Klein et al., 1992, "An Object–Oriented Framework for Curves and Surfaces".

Inspec Abstract No. 4426852, from Benveniste et al., 1992, "Concurrent Programming Notations in the Object–Oriented Language Arche".

Inspec Abstract No. 4425343, from Demurjian et al., 1993, "Programming Versus Databases in Object–Oriented Paradigm".

Inspec Abstract No. 4417604, from Kariem et al., 1992, "Mapping of Conceptual Specifications Into Object–Oriented Programs".

Inspec Abstract No. 4417563, from E. Maim, 1992, "Recognizing Objects from Constraints".

Inspec Abstract No. 4411998, from Yi Deng et al., 1992, "Unifying Multi–Paradigms in Software System Design".

Inspec Abstract No. 4408394, from Allen et al., 1992, "GEM: Global Event Management in CAD Frameworks".

Inspec Abstract No. 4400350, from Y. Shoham, 1993, "Agent–Oriented Programming".

Inspec Abstract No. 4395549, from Hogstrom et al., 1992, "Portability and Data Structure in Scientific Computing–Object–Oriented Design of Utility Routines in Fortran".

Inspec Abstract No. 4391388, from Thomas et al., 1992, "A Generic Object–Oriented Concurrency Mechanism for Extensibility and Reuse of Synchronization Components".

Inspec Abstract No. 4387201, from Chu et al., 1992, "A Pattern Based Approach of Integrating Data and Knowledge to Support Cooperative Query Answering".

Inspec Abstract No. 4366189, from Holt et al., 1992, "A Framework for Using Formal Methods in Object–Oriented Software Development".

Inspec Abstract No. 4356300, from Bertino et al., 1993, "Path–Index: An Approach to the Efficient Execution of Object–Oriented Queries".

Inspec Abstract No. 4341376, from Bertino et al., 1992, "Optimization of Object–Oriented Queries Using Path Indices".

Inspec Abstract No. 4331060, from Lau et al., 1992, "An Object–Oriented Class Library for Scalable Parallel Heuristic Search".

Inspec Abstract No. 4318465, from P. Madany, 1992, "Object–Oriented Framework for File Systems".

Inspec Abstract No. 4302722, from Eggenschwiler et al., 1992, "ET ++SwapsManager: Using Object Technology in the Financial Engineering Domain".

Inspec Abstract No. 4298324, from S. Nichol, 1992, "Extending Turbo Vision".

Inspec Abstract No. 4297404, from Tanaka et al., 1992, "Two–Level Schemata and Generalized Links for Hypertext Database Models".

Inspec Abstract No. 4287814, from Natarajan et al., 1992, "Issues in Building Dynamic Real–Time Systems".

Inspec Abstract No. 4281362, from Marshall et al., 1991, "Using VDM within an Object–Oriented Framework".

Inspec Abstract No. 4275707, from Tsukamoto et al., 1991, "DOT: A Term Represetnation Using DOT Algebra for Knowledge Bases".

Inspec Abstract No. 4275698, from Van den Bussche et al., 1991, "Evaluation and Optimization of Complex Object Selections".

Inspec Abstract No. 4275693, from Giannotti et al., 1991, "Non–Determinism in Deductive Databases".

Inspec Abstract No. 4270361, from Artale et al., 1991, "Introducing Knowledge Representation Techniques in Database Models".

Inspec Abstract No. 4270125, from Becker et al., 1991, "Reusable Object–Oriented Specifications for Decision Support Systems".

Inspec Abstract No. 4258492, from M. Ball, 1992, "Inside Templates: Implementing C++ Strategies".

Inspec Abstract No. 4258051, from Rudensteiner et al., 1992, "Set Operations in Object–Based Data Models".

Inspec Abstract No. 4244023, from George et al., 1991, "An Object–Oriented Data Model to Represent Uncertainty in Coupled Artificial Intelligence–Database Systems".

Inspec Abstract No. 4234438, from Madany et al., 1991, "Organizing and Typing Persistent Objects Within an Object–Oriented Framework".

Inspec Abstract No. 4152687, from M. Wolczko, 1992, "Encapsulation, Delegation and Inheritance in Object–Oriented Languages".

Inspec Abstract No. 4117514, from Wuwongse et al., 1991, "An Object–Oriented Approach to Model Management".

Inspec Abstract No. C9204–6110J–017, "Choices Frameworks and Refinement", R.H. Campbell et al., 1991.

Inspec Abstract No. 4090970, from P. Kougiouris, 1991, "Device Management Framework for an Object–Oriented Operating System".

Inspec Abstract No. 4077440, from A. Mahler, 1991, "Organizing Tools in a Uniform Environment Framework".

Inspec Abstract No. 4067033, from Shaw et al., 1990, "Experience with the ET++ Application Framework".

Inspec Abstract No. 4060084, from Muller et al., 1990, "ODICE: Object–Oriented Hardware Description in CAD environment".

Inspec Abstract No. 4050569, from Di Giovanni et al., 1990, "HOOD Nets".

Inspec Abstract No. C91072815, from Holtkamp et al., 1990. "DEMOM–A Description Based Media Object Data Model".

Inspec Abstract No. C91072016, from A. Lane, 1991, "/DOS/C++–Application Frameworks".

Inspec Abstract No. C91072574, from Hemery et al., "An Analysis of Communication and Multiprogramming in the Helios Operating System".

Inspec Abstract No. C91064787, from Madany et al., 1989, "A Class Hierarchy for Building Stream–Oriented File Systems".

Inspec Abstract No. C91064580, from Gamma et al., 1989, "Integration of a Programming Environment Into ET++–A Case Study".

Inspec Abstract No. C91058815, from Menga et al., 1990, "G++: An Environment for Object Oriented Analysis and Prototyping".

Inspec Abstract No. B91052096, from Cusack et al., 1990, "Object–Oriented Specification in LOTOS and Z, or My Cat Really is Object–Oriented!".

Inspec Abstract No. C91053475, from Queinnec et al., 1988, "An Open Ended Data Representation Model for EU–LISP".

Inspec Abstract No. C91053151, from E. Cusack, 1991, "Refinement, Conformance and Inheritance".

Inspec Abstract No. C91042802, from T. Yokoyama, 1990, "An Object–Oriented and Constraint–Based Knowledge Representation System for Design Object Modeling".

Inspec Abstract No. C91041980, from Choi et al., 1991, "Graph Interpretation of Methods: A Unifying Framework for Polymorphism in Object–Oriented Programming".

Inspec Abstract No. C91042655, from Q. Li, 1991, "Extending Semantic Object Model: Towards More Unified View of Information Objects".

Inspec Abstract No. C91024852, from Pierra et al., 1990. "An Object Oriented Approach to Ensure Portability of CAD Standard Parts Libraries".

Inspec Abstract No. C91010951, from T. Helton, 1991, "Level5 Object".

Insepc Abstract No. B90075006, from Gossain et al., 1989, "Designing a Class Hierarchy for Domain Representation and Reusability".

Inspec Abstract No. C91003997, from J. Muys–Vasovic, 1989, "MacApp: An Object–Oriented Application Framework".

Inspec Abstract No. C91004708, from Bertino et al., 1990, "Optimization of Queries Using Nested Indices".

Inspec Abstract No. C90052277, from I. Tervonen, 1990, "Object–Oriented Development as a Multiview Software Construction Methodology".

Inspec Abstract No. C90052627, from Schreff et al., 1988, "A Knowledge–Based Approach to Overcome Structural Differences in Object Oriented Database Integration".

Inspec Abstract No. C90047457, from Yokoyama et al., 1990, "A Constraint–Based and Object–Oriented Knowledge Representation".

Inspec Abstract No. C90034818, from Q. Chen, 1988, "Extending the Object–Oriented Paradigm for Supporting Complex Objects".

Inspec Abstract No. C90030609, from Forde et al., 1990, "Object–Oriented Finite Element Analysis".

Inspec Abstract No. C90007733, from Weinand et al., 1989, "Design and Implementation of ET++, A Seamless Object–Oriented Application Framework".

Inspec Abstract No. C89062837, from Pasquier–Boltuck et al., 1988, "Prototyping an Interactive Electronic Book System Using an Object–Oriented Approach".

Inspec Abstract No. C890586727, from Campbell et al., 1989, "Principles of Object–Oriented Operating System Design".

Inspec Abstract No. C89056859, from Hull et al., 1989, "On Accessing Object–Oriented Databases: Expressive Power, Complexity and Restrictions".

Inspec Abstract No. C89049257, from Madany et al., "Class Hierarchy for Building Stream–Oriented File Systems".

Inspec Abstract No. C89039001, from Brophy et al., 1989, "A Framework for Multiple, Concurrent Graphical Representation".

Inspec Abstract No. C89033226, from Corradi et al., "PO: An Object Model to Express Parallelism".

Inspec Abstract No. C89014870, from R. King, 1988, "Semantic and Object–Oriented Database Support for Software Environments".

Inspec Abstract No. C89003142, from Tenma et al., 1986, "A System for Generating Language–Oriented Editors".

Inspec Abstract No. C88013915, from Woelk et al., 1987, "Multimedia Information Management in an Object–Oriented Database System".

Inspec Abstract No. C88007447, from P. Allen. 1987, "A Framework for Implementing Multisensor Robotic Tasks".

Inspec Abstract No. C87007043, from Whitted et al., 1986, "Exploiting Classes in Modeling and Display Software".

Inspec Abstract No. C86039588, from K. Fukunaga, 1985, "PROMPTER: A Knowledge Based Support Tool for Code Understanding".

Inspec Abstract No. C86024804, from Greespan et al., 1986, "A Requirements Modeling Language and Its Logic".

Inspec Abstract No. C84005713, from Meyer et al., 1983, "Towards a Two–Dimensional Programming Environment".

Inspec Abstract No. C81005505, from Mylopoulos et al., 1980, "Some Features of the TAXIS Data Model".

OBJECT ORIENTED SERVER PROCESS FRAMEWORK WITH INTERDEPENDENT-OBJECT CREATION

BACKGROUND OF THE INVENTION

1. Field of the Invention

This invention relates generally to data processing systems and, more particularly, to object oriented programming systems and processes.

2. Description of the Related Art

In a computer system having a distributed database, data communication is often implemented according to a client/server model, in which client processes send requests to a server for data or for the use of other computer system resources. For example, it is common for large amounts of data files to be stored on a computer called a file server, which communicates with multiple user machines over a local area network (LAN). The user machines comprise the clients of the file server. The clients send requests for data or for other network services (such as printing or system error reporting) to the file server, which returns the data or provides the requested service.

Server functions may be performed by one or more server processes executing in the operating environment of the server. In an object oriented programming (OOP) environment, the server processes can be implemented as server objects. That is, the operating system process/job of the file server supports an object oriented programming environment in which an OOP object representing the server manages other server objects that perform the file server functions.

OOP techniques encapsulate, or bind together, data and the methods that operate on them. This encapsulation permits program development to more closely model real-world systems for problem solution and breaks up program development efforts into smaller, more manageable pieces. OOP programs are developed around object classes that have attributes, also called data values, and methods, also called functions. Although OOP techniques have done much to improve program development efficiency, such techniques still require a great degree of code generation on the part of developers and limit program reuse.

OOP frameworks have been developed in an effort to further reduce program development costs. A framework is a set of OOP classes that embodies a predetermined set of attributes and methods for providing a common group of behaviors. An application program developer utilizes the framework and builds upon it, starting with the classes, attributes, and methods defined by the framework designer and adding subclasses and attributes and modifying methods depending on the problem to be solved. Such changes to the framework are typically referred to as framework extensions, and are made possible by the OOP notions of inheritance and polymorphism. The challenge confronting framework developers, then, is to define a set of classes and methods that will best support the desired problem solution and will accept the most likely framework extensions. Thus, the designer of a framework must carefully assess what framework users will most likely need in the way of classes and attributes.

With respect to client/server operating environments, it may be desired to add new server functions or services from time to time. Such changes in server functioning usually require modification to the server programming logic, including possibly adding classes. Modification of much code might be necessary, because the server functions are typically extremely interdependent. For example, adding a new problem reporting function to a server may require modification to the server functioning for network client communication and for log processing. That is, adding the new problem reporting function might require modification of the server logic for two other pre-existing functions. This type of logic interdependency complicates server maintenance and server development because each change in functioning can result in many other modifications that must be propagated throughout the server programming code. Similarly, it might be necessary to add a new type of server to support a new type of hardware device, such as a graphics file library or communications server. Again, interdependencies might make it necessary to propagate changes through the server program. It would be preferable if new server functions and types could be added without need for extensive server logic modification.

From the discussion above, it should be apparent that there is a need for a server program development tool that permits program developers to more quickly develop and more easily maintain server programs. The present invention fulfills this need.

SUMMARY OF THE INVENTION

In accordance with the present invention, a reusable object oriented (OO) server framework in an object oriented programming system defines a server object that manages the server operation and defines a class of service objects for carrying out the server functions. The server object retrieves system configuration information and then examines a list of registered service object names to construct appropriate service objects. Needed information about operation of the service objects in the computer system is obtained from the configuration information. Each of the service objects, in accordance with the framework, includes two methods that are executed in sequence to "bootstrap" proper service object functioning, resolve interdependencies, and provide the desired system service. From such a server framework, it is possible to produce a server that can easily be modified to support new types of service objects for performing new service functions, without modification to the base server object. In this way, the server framework of the invention provides an OO base on which server program developers can more easily add specific server types and processing features.

The framework includes classes for which it is anticipated extension subclassing with new attributes and methods will occur. A server program developer can customize the extension classes to meet the needs of users and create all user interfaces with the server program, permitting the server developer to more quickly complete program development and more easily perform software maintenance. It is expected that the program developer will provide the end-user interface, which establishes a means for the server end-user to communicate with the server program to receive, process, and report data. Thus, the framework of the present invention frees the program developer to concentrate on server program features, which can easily be implemented by extending the OO classes and methods of the OO framework. The framework thereby provides a base from which a variety of servers can be quickly and efficiently produced.

The framework includes object oriented classes that specify object data attributes and methods. The server program developer who adopts the framework of the invention and extends it is free to add specialized service objects consistent with those specified in the framework to provide a unique suite of functions and operations, resulting in the production of a server that can then be utilized by an end user. A single server object of the framework provides a data object location for managing the service objects that will carry out the server processing. Using OOP principles, the framework adopter can add server features not present in the framework to support server functions and types desired by customers in a particular market niche. In this way, the framework adopter maximizes the exploitation of program commonality and the reuse of programming efforts, thereby reducing program development time and software maintenance costs.

Other features and advantages of the present invention should be apparent from the following description of the preferred embodiment, which illustrates, by way of example, the principles of the invention.

DESCRIPTION OF THE PREFERRED EMBODIMENT

Figure 1:
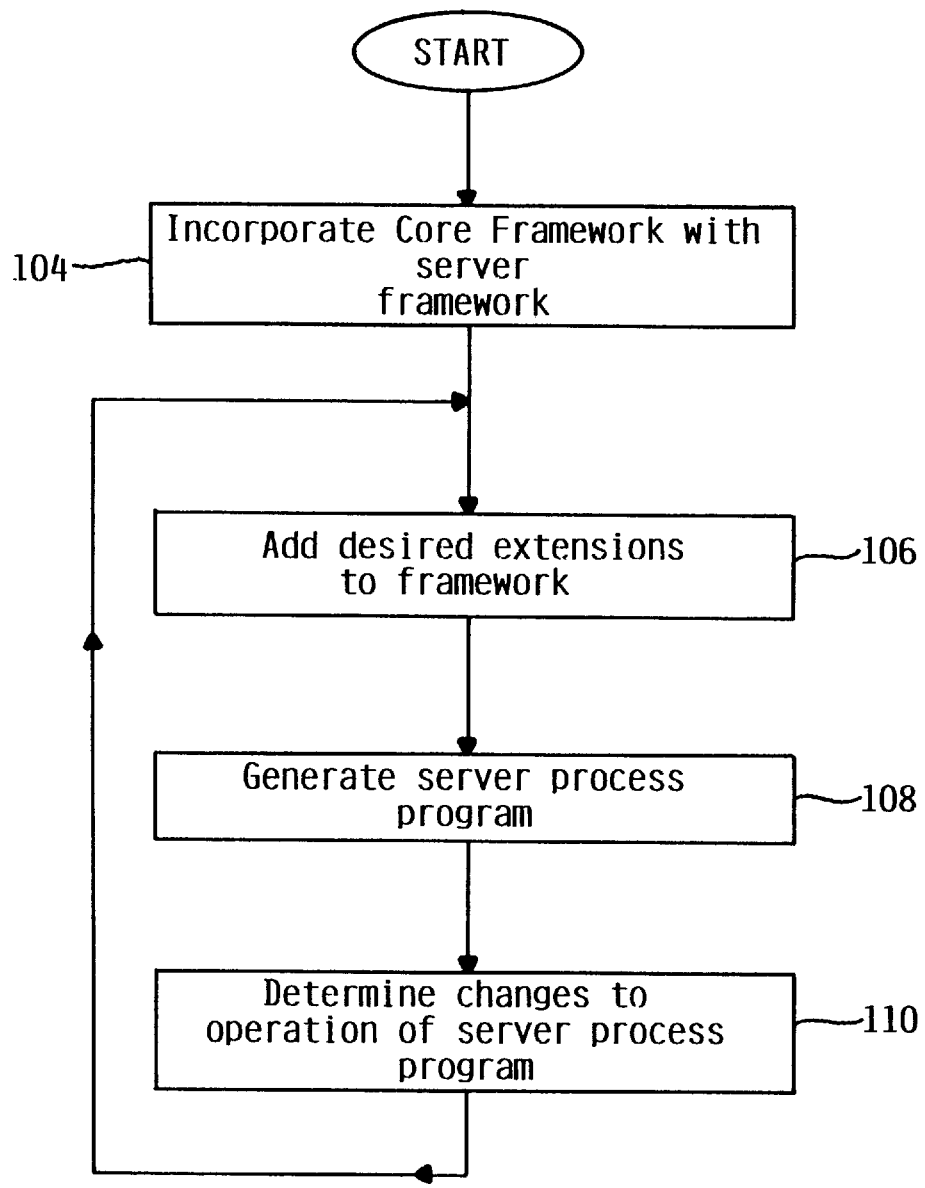
FIG. 1 is a flow diagram representation of the application development process that utilizes the framework of the invention to provide a server program.

In the preferred embodiment of the invention, the object oriented framework for a client/server programming environment includes a Server object class category that provides the server environment in which objects performing server functions exist, contains methods to create specific server function objects based on system configuration information, supports server function object interdependencies without sacrificing generic server object creation, and serves as the primary interface between the server and the client machines. The framework also includes a Service object class category that contains a class called Service Object (SO), whose objects comprise the server function objects and implement two methods, one method called runMeFirst( ) and another method called runMeSecond( ). The Server object instantiates the SO objects and operates to ensure that the runMeFirst( ) method is executed before the runMeSecond( ) method.

Requiring each SO object to include the two methods, and processing them sequentially, ensures resolution of the object interdependencies, which usually occurs when one server function requires resources or information provided by another. In particular, creation of the SO objects is not specified to be in any particular order, and therefore for any two SO objects that are created and that have interdependencies, neither object can assume the other has already been created. No methods of the SO objects, however, are completely executed until all the SO objects have been instantiated. Therefore, the first method of each SO object (the runMeFirst( ) method) can assume that its interdependent counterpart object has at least been created by the time the first SO object method is operating, even if the counterpart object is not fully operational. It should be understood that the developer of each SO object must determine how that SO object will stepwise become fully functional, using the required first and second methods.

If an instantiated SO object requires special configuration information to bring itself up to operational status, then such configuration information can be provided from the configuration information that the Server object uses to determine the SO object class name. Such configuration information is provided as a parameter to the runMeFirst( ) method of the SO object. Such optional functioning will be determined by the framework adopter who is developing the server program. After the SO objects are established, the Server object provides methods that permit the SO objects to register their existence to the entire computer network or to just a particular server process.

To explain the framework of the present invention and the manner in which it operates, an exemplary server program development procedure using the framework will be described, followed with a description of a computing system environment suitable for the development procedure and the OO structure of the framework. Next, the object class structure of the framework will be described, followed by a description of the processing of the extended framework, using a flow diagram description of the server operation.

1. Server Program Development

FIG. 1 is a flow diagram representation of the steps performed with a computer system to produce a server program using the framework of the present invention. The preferred embodiment is implemented in the "Java" programming language, but it should be understood that other programming languages also could be used.

A server program constructed with the framework of the preferred embodiment is designed to obtain certain information from objects of related core classes, as described further below. Such information will include computer and network information concerning the computer system environment in which the server is to operate, identification of users and protocols, as well as other information needed to carry out operating in the computer system. In the preferred embodiment, these core classes are organized into a core framework (CF) that is complementary to the framework of the present invention.

The server program developer provides a user interface with the features and "look and feel" desired, and combines operating interface features of the core object classes with the structure and functionality of the server OOP framework constructed in accordance with the present invention, and also adds particular framework extensions as needed, to generate a server program. The resulting server program can be used by customers, such as network operating system programmers, to carry out server functions and other tasks in the computer system program domain. In the following description, "framework" will refer to the framework illustrated in the drawing figures and "server program" will refer to a computer system program that comprises an implementation of the extended framework, produced by a server program developer who uses the framework, to perform server functions.

In the FIG. 1 flow diagram, the first step of server program development is to incorporate a core framework of classes with the Server framework of the invention, as represented by the flow diagram box numbered 104. In the preferred embodiment, the core framework (CF) is a set of base business application classes that are shared by multiple development programs. The first step of FIG. 1 includes the incorporation of any such object classes necessary for the system on which the server program will run. The preferred embodiment achieves operating platform independence and system program inter-operability by extending classes from the core CF framework. Thus, in this first step 104, the program developer will incorporate object classes necessary for achieving operating system independence and system program inter-operability by extending and subclassing from the CF classes. In this way, the server program can interface with multiple operating systems because only the CF extensions need change to accommodate new operating systems, while the server program can remain the same. In a similar way, associated client programs can more easily interface with the extended server program because the core, common set of CF classes will be known and will form a common interface.

The next step of server program development is to add desired extensions to the server framework itself, including the user interface. To implement this part of the program development process, the server developer-framework adopter must decide upon the particular extensions needed for the desired server operations and user interface, including any modifications or extensions to the service class attributes and behaviors. The framework extensions are implemented by the program developer in a manner dependent on the particular computer system on which the framework is received and manipulated. Such processing is represented in FIG. 1 by the flow diagram box numbered 106.

After the framework extensions are decided upon, the next step is to generate the server program (that is, the executable code). This step is represented by FIG. 1 the flow diagram box numbered 108. The generation of an executable server program is generally referred to as program compilation. The details of this step also will depend on the particular computer system on which the framework is used, as will be appreciated by those skilled in the art. Changes to the compiled program might be desired, both as part of the initial program debug and as part of revisions due to comments received from actual use, such as supporting additional server functions. The process of determining such desired changes is represented by the flow diagram box numbered 110. W hen such changes are determined, they must be implemented in to the server program structure in the form of modified classes, attributes, and methods, which comprise further extensions to the framework. This is represented by the flow diagram path from the "determine changes" step at box 110 back to the "add desired extensions" step at box 106.

Thus, the design of the framework provides base classes on which server program developers can build to add specific features they deem important. With the core CF business classes, the framework classes can remain platform independent so that framework extensions are simplified. In this way, the server program is easily modified without need for writing multiple versions of the program code because the revision of framework classes, attributes, and methods in accordance with the invention is platform independent. Easier development of new code, and seamless operation with applications using the same core classes, is ensured.

2. Operational Structure

Figure 2:
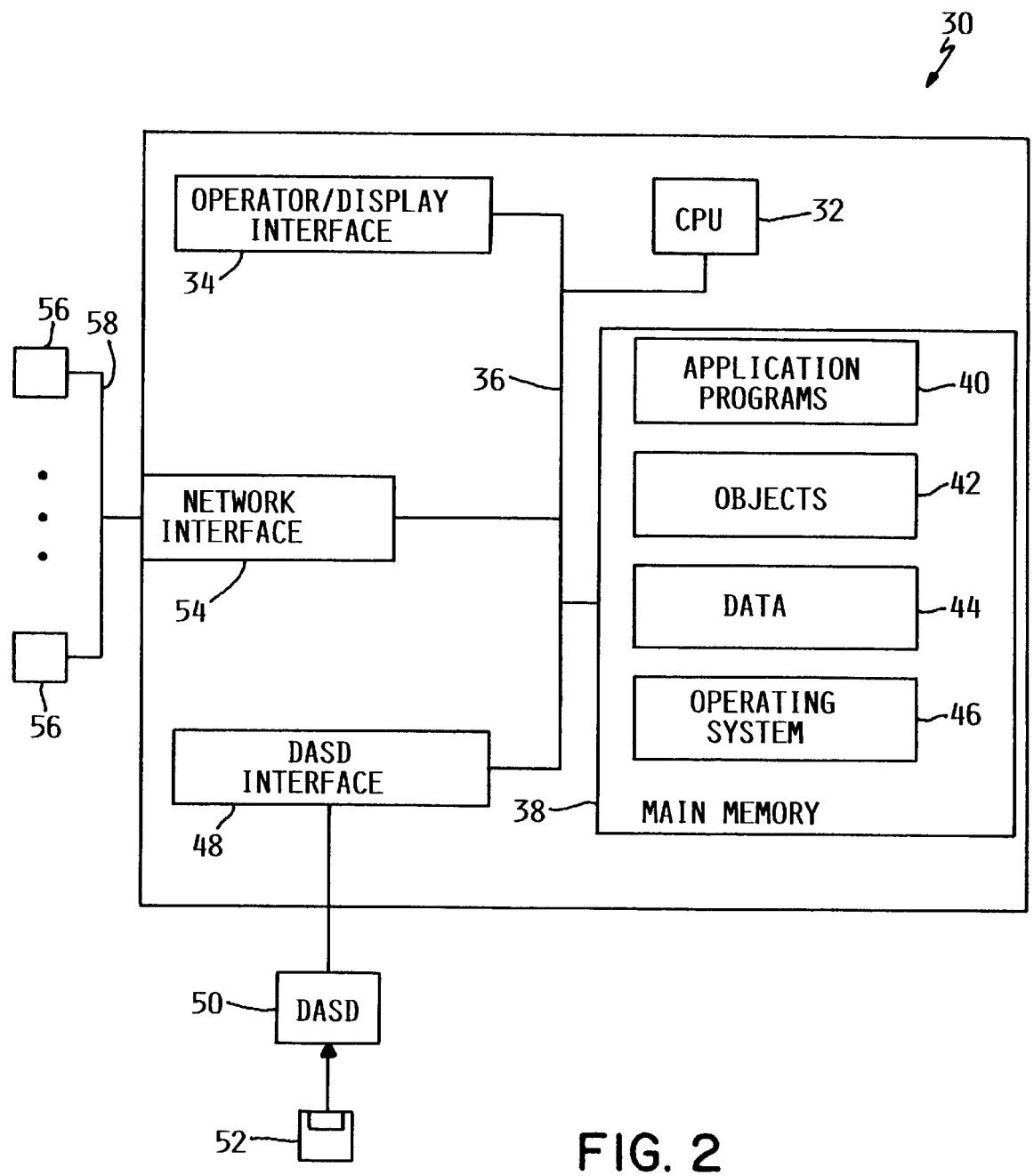
FIG. 2 is a block diagram of a computer system constructed in accordance with the invention.

FIG. 2 is a block diagram of a computer system 30 constructed in accordance with the present invention. The computer system is suitable for utilizing the server framework of the invention to develop a server program, and for extending the framework. The computer system 30 includes a central processing unit (CPU) 32 that operates in response to operator commands, which it receives from an operator/ display interface 34 to which it is connected by a system bus 36. The CPU also communicates over the system bus with a main memory 38. The main memory is illustrated containing a variety of data structures, including application programs 40, objects 42, data 44, and an operating system 46. The application programs include programs such as the server program generated by extending the framework of the present invention. The main memory 38 is represented as a single entity, but those skilled in the art will appreciate that the main memory can comprise a combination of random access memory (RAM), hard disk drives, optical disk drives, and other storage devices containing logically segmented storage locations.

The operating system 46 preferably supports an object oriented programming environment such as provided, for example, by the C++ programming language and the "Java" programming language. The application programs 40 are invoked, or launched, by a user through the operator/display interface 34. The application programs can be written in a variety of languages, including C++ and Java. The objects 42 are object data structures of an object oriented programming language, such as C++ or Java.

The computer system 30 also includes a direct access storage device (DASD) interface 48 that is connected to the system bus 36 and also is connected to a DASD 50. Those skilled in the art will appreciate that the DASD 50 can receive and read from program products comprising machine-readable storage devices 52, such as magnetic media disks on which are recorded program instructions whose execution implements the framework of the present invention. The storage devices 52 also can comprise, for example, media such as optical disks and other machine-readable storage devices. The computer system 30 also includes a network interface 54 that permits communication between the CPU 32 and other computer systems 56 over a network 58. The other computer systems can comprise, for example, computer systems similar in construction to the exemplary computer system 30. Thus, the computer system 30 can receive data into the main memory 38 over the network 58 after communication between the computer systems 30, 56 has been established by well-known methods that will be understood by those skilled in the art without further explanation.

3. Server Framework Components

Figure 3:
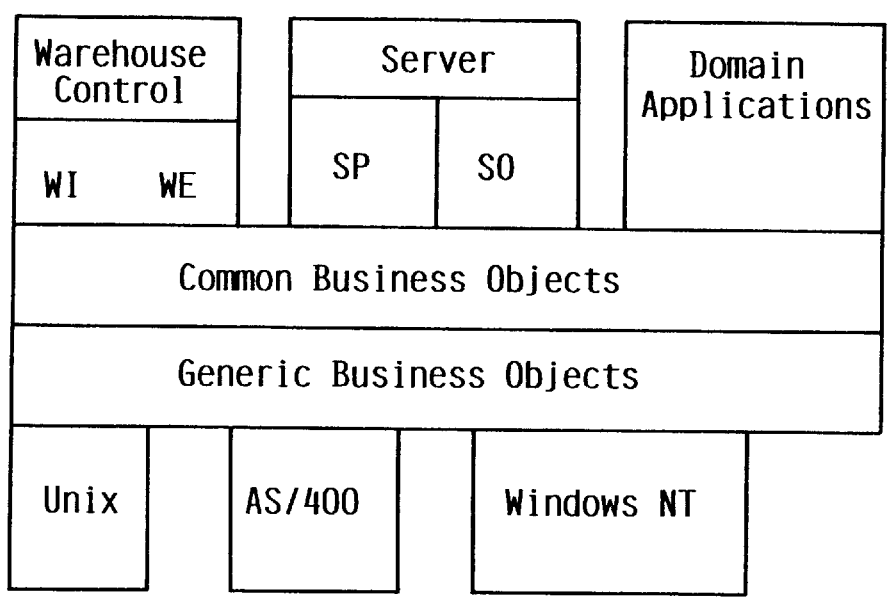
FIG. 3 is a representation of the computer system of FIG. 2, showing the server mechanisms that comprise the Server framework of the invention, and also showing related common business objects utilized by the extended Server framework of the invention.

FIG. 3 is a representation of the framework that operates in the system of FIG. 2, showing the Server program that is the subject of this description. The Server program is shown having a Server Process (SP) module and a Service Object (SO) module, attached to a Common Business Objects framework (CBOF) mechanism and a Generic Business Objects framework (GBOF) mechanism, which together comprise a core framework (CF) utilized by the framework of the invention. The CF provides common functionality to permit communication between system application mechanisms (such as the Server Process) and different operating platforms, which are indicated in FIG. 3 by the modules indicated as "Unix", "AS/400", and "Windows NT" attached to CF.

Server program developers (and developers of other programs that interface with CF) will add subclassing to the classes of which CBOF and GBOF are comprised. The classes of CBOF, for example, will include company identification classes that can serve as base classes for defining networks, databases, or companies to multiple programs. A CBOF "Network" class might contain general network configuration identifying information. Another system program, such as a network communication program, might include classes that identify networks that are connected to the network of the invention. The GBOF classes are more directly related to the operating system and computer system side of the operating environment. That is, the GBOF classes are responsible for object persistence according to the operating system and object environment being supported, so that a Server object that wants to maintain an object in persistent data storage must interface with GBOF classes. All application programs in related subject areas, or domains, should be able to make use of the common object classes specified by the CBOF and GBOF classes.

In FIG. 3, a mechanism called Warehouse Control is shown attached to the CF (CBOF/GBOF) combination, along with a module identified as "Domain Applications". The Warehouse Control mechanism comprises a Warehouse Internal (WI) module and a Warehouse External (WE) module. All of these mechanisms are shown attached to the CF to indicate that other modules may be developed that communicate with the Server program. In this way, other programs may communicate with the Server program and similarly interface with different operating platforms. It should be understood that the mechanisms shown interfacing with the CF and interfacing with the alternative operating systems are exemplary only. That is, it is contemplated that additional domain applications may interface with the Server mechanism, and it also is contemplated that additional operating platforms may interface with the Server mechanism.

The CF interface, however, does not form a part of the invention described herein. As noted above, those skilled in the art should be able to produce, without further explanation, a framework that provide the common functionality between operating systems and application domains that are provided by CF.

4. Server Category Diagram

Figure 4:
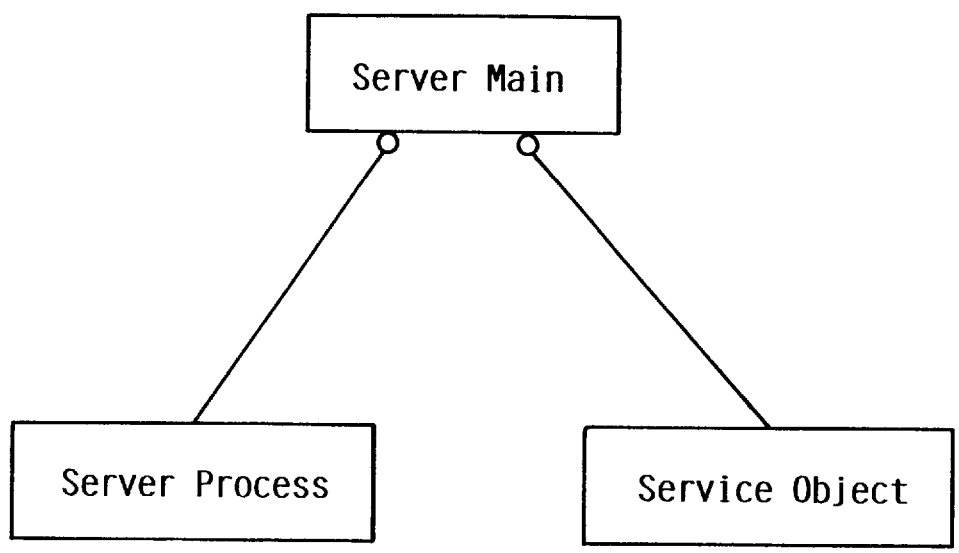
FIG. 4 is a category diagram representation of the Server category.

FIG. 4 is a category diagram for the Server program of the extended framework implemented in the computer system of FIG. 2. Those skilled in the art will appreciate that the categories illustrated in FIG. 4 contain groups of OOP classes that encapsulate data attributes and behaviors, and are stored in the memory of the computer system. Such classes can be implemented, for example, in a computer system operating environment that supports the "Java" programming language or the "C++" programming language. It should be understood that a category as used in this description refers to describing the classes that make up the framework in terms of categories, for purposes of easier explanation. The categories do not necessarily represent a structure that is reflected in any programming implementation of the framework. Those skilled in the art will understand that the OO classes specify characteristics of the objects that will be instantiated at run time and will cooperate to perform the program functions.

The Server categories include a Server Main category that is responsible for creating the programming environment for the framework, a Server Process category, and a Service Object category. In particular, the Server Main category contains those objects that host the Service Object (SO) objects that will actually perform the server functions. That is, the operating logic that makes a system process such as the Server program perform as a server is contained within the SO objects.

Thus, the Server Main category comprises a method or methods that create the objects it is instructed to create and provides the means for those objects to resolve any interdependencies with each other. In this way, all of the logic that provides server functioning is contained within the objects of the server program process, so that the means for resolving interdependencies comprises the methods and attributes of the service objects. As described more fully below, the Server Main category includes a Global Server Manager class of objects and a Local Server Manager category of objects, along with a main server implementation method called ServerImpl.main( ) that makes appropriate calls to other objects and thereby retrieves appropriate configuration information and server functioning parameters to instantiate the correct objects and ensure proper server start-up and functioning.

A server generated from the framework of the present invention serves as host to an instantiation of a Global Server Manager category object. That is, the Server of the extended framework will receive configuration information about the SO objects to be created, but first will use bootstrapping logic contained within its program code to create an instance of a Global Server Manager object. The Global Server Manager object will be created by calling a server manager implementation method called SmServerImpl.main( ) to pass a flag indicating that the sending process is the server process in which the global server manager objects will reside. Startup processing, described further below, will then be performed to instantiate the Global Server Manager object. The Global Name Server object also will be instantiated, as it is needed by the Global Server Manager.

5. Server Class Diagram

Figure 5:
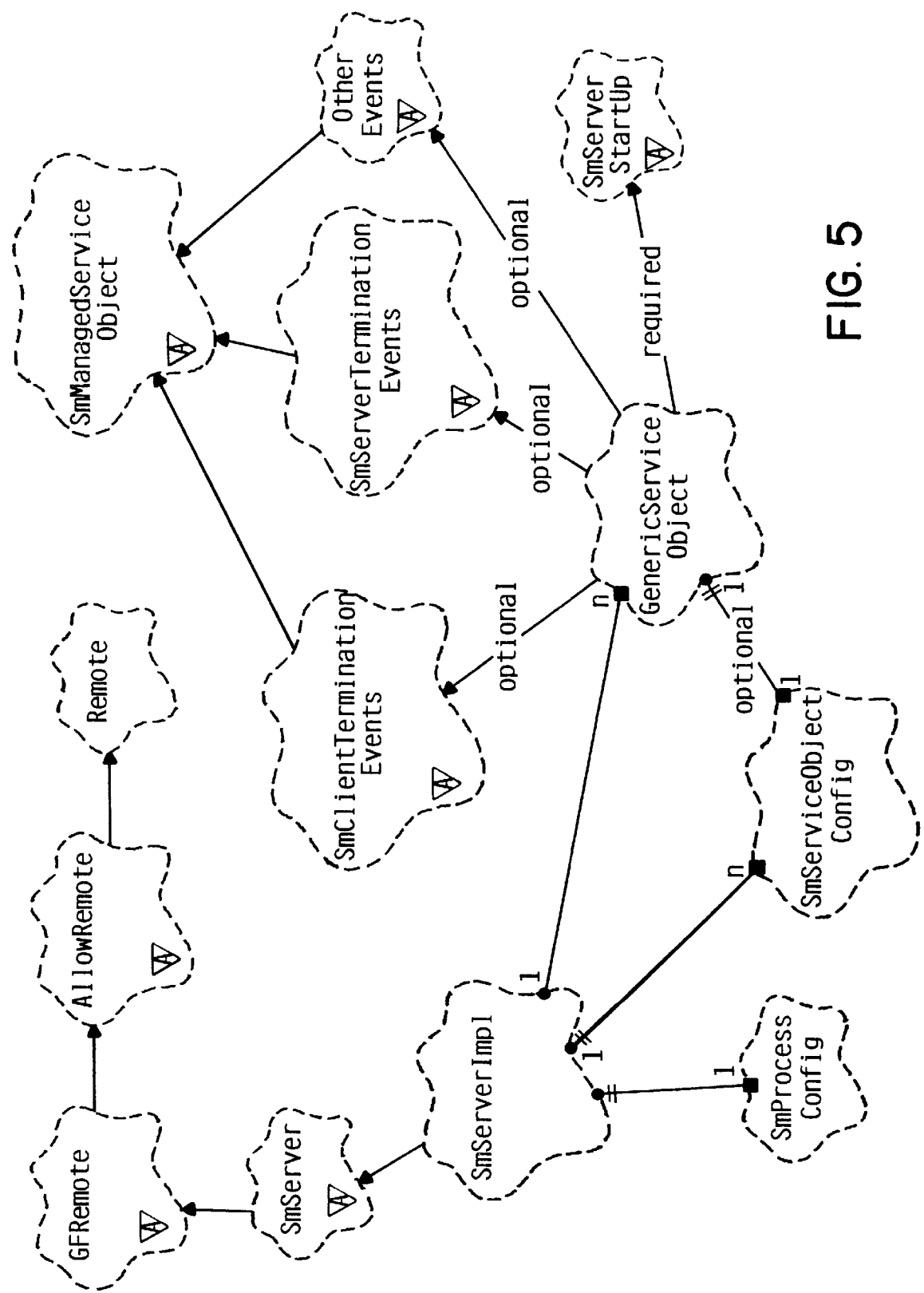
FIG. 5 is a class diagram of the ServiceObject category illustrated in FIG. 4, showing the Generic Service Object class and related classes.

There is no uniform standard for describing OO programming, but FIG. 5 and this description will use the widely followed convention that class names comprise descriptive words whose initial letters are upper case, typically concatenated together. FIG. 5 is a class diagram that represents framework objects with object "clouds" and illustrates the characteristics of the primary server framework classes.

The GenericServiceObject in FIG. 5 is not an actual, specific object class, but is used to represent any class member (to be defined by the framework user) that is potentially a service object (SO) of the Server. The GenericServiceObject class cloud is used to illustrate the relationship between the potential SO object and the classes of the framework. For example, those skilled in the art will appreciate that the connecting line between the SmServerImpl class cloud and the GenericServiceObject cloud indicates a one-to-n "has" relationship from the SmServerImpl cloud to the GenericServiceObject cloud.

a. SmServerImpl Class

The SmServerImpl class is responsible for implementing the Server methods and will contain the SmServerImpl.main( ) method that is called to initiate the Server startup and provide the operating environment in which the Service Object (SO) will exist. Accordingly, the class cloud cardinality of the connecting line is indicated as one SmServerImpl object to n GenericServiceObject objects. Thus, the SmServerImpl object is the object that implements the server methods.

The SmServerImpl class includes methods such as: bringupGSMServer( ), which contains the Global Server Manager and the Global Name Server; createLocalUID( ), which returns a local unique identifier for a process; createServiceObjects( ), a method that steps through a list of class names to create an SO object instance of each; getLocalHostName( ), a method that returns the host name of the local system; and getServerProcessName( ), a method that returns the name of the server process being implemented; and other additional methods. Other methods included in the SmServerImpl class perform functions such as: processing input parameters; registering service objects with the SmServerImpl object and with the Global Server Manager for unregistering; and for other system processing functions such as error detection, validation, and command retrieval.

The SmServerImpl class makes use of methods that are preferably contained in the CF core framework and are shared with other system applications. In particular, the preferred embodiment makes use of two CF methods, one called createServiceObjectByClass( ) that is used by the Global Server Manager object to tell the hosting Server Process to instantiate a service object specified by class, and another method called createServiceObjectByName( ), which is used by the Global Server Manager to tell the hosting Server Process to instantiate an SO service object specified by object name.

b. SmServer Class

This is an abstract base class whose objects act as hosts of the Service Objects implemented according to the present framework invention. This class makes use of CF methods that are used by the Global Server Manager object to instantiate specific service objects by class and by service name, to stop various server processes if necessary, and to validate processes.

c. SmServiceObjectConfig Class

This is an abstract base class whose objects contain configuration information of a particular class of SO objects. There will be one subclass of each SmServiceObjectConfig object for each type of SO object. Thus, the cardinality from the SmServerImpl class to the SmServiceObjectConfig class is one-to-n. Each subclass will have information that is specific to the type of SO service object to which it corresponds and will have "get" and "set" methods for such information, to permit display and communication of such information to other system objects. This class must be an observable class, so that if multiple network system users reference a single instance of this class and any one user changes the object instance, then all users will be notified of the change.

This class includes methods that initialize SO object configurations (SOCs), retrieve and process class names, construct appropriate types of SO configuration objects, and list/update/validate viewable item information.

d. SmServerStartUp Class

As noted above, the GenericServiceObject class cloud does not represent a specific class, but is used to show the classes with which any potential SO object must have relationships. FIG. 5 shows that a required inheritance relationship extends from the SmServerStartUp abstract base class to the SO object, such that the SO object inherits structure and behavior from the SmServerStartUp class.

The SmServerStartUp class includes a method called runMeFirst( ) that is called by the SmServerImpl object after that object has created the Service objects whose class names were passed to it as a parameter. The SmServerStartUp class also includes a runMeSecond( ) method that is called by the SmServerImpl object after that object has already called the runMeFirst( ) method on the Service objects it has created. The SmServerStartUp class also includes a stopServiceObject( ) method to stop a specific SO object processing, after receiving notification.

Thus, the SmServerStartUp class is the interface for classes that will be instantiated dynamically by an object of the SmServerImpl class. After the SmServerImpl object instantiates an object for each class it receives as a parameter, the SmServerImpl object will examine each of the instantiated objects, calling the runMeFirst( ) method on each object. After the runMeFirst( ) method has been called on each object, the ServerImpl will then call the runMeSecond( ) method on each object. This multiple-pass procedure through the SO objects will permit these objects to resolve any interdependency issues they may have with the other SO objects being created.

The SmServerImpl can dynamically instantiate a class object in either of two ways: first, a SmServiceObjectConfiguration object can be created for the SO object being instantiated and can be associated with the Server program process. When the Server process is started, the class name for the SO object is provided to the ServerImpl.main( ) method as an object to be instantiated. The second way to dynamically instantiate a class member is to use the SmServer.startServiceObject( ) method. Thus, Server functions are performed as needed by Server objects that are instantiated as needed.

Those skilled in the art will understand that classes dynamically instantiated in either of these two ways will need to provide a default constructor, because the ServerImpl object will be instantiating the SO object using the class name of the object and will not actually be aware of the type of object being created.

It should be noted that any process-fatal problems detected during the server bringup process will terminate the Server process. The Server process will attempt to notify registered SO objects of the impending termination, but this notification is not guaranteed to occur; notification will come in the form of a method call by SmManagedServiceObject.stop( ). Those skilled in the art will be aware that this circumstance should be taken into consideration for SO objects being started in this manner.

e. Termination Events Classes

FIG. 5 shows that the Generic Service Object class has optional inheritance relationships with two termination events classes, SmClientTerminationEvents and SmServerTerminationEvents. These two classes provide the interface that all SO objects must implement if they are to be notified about events relating to client or server process termination, respectively. The objects of these classes contain SO object management methods that will be used for communication between the SmServerImpl object and the objects with which it has registered. Thus, these classes contain process stop methods.

f. SmManagedServiceObject Class

FIG. 5 shows that three classes inherit from the SmManagedServiceObject abstract base class, the two termination events classes described above and the "Other Events" class. Those skilled in the art will appreciate that the Other Events class represents additional events for which particular processing will be provided. The SmManagedServiceObject class is the interface for the valid events with which a Managed Service Object can register. Objects of this class are subdivided into separate subclasses so service objects that do not have an interest in certain events do not need to delete or render inoperative the methods for those uninteresting events; rather, the framework user simply declines to implement those service objects to implement that subclass.

It should be noted that this interface does not actually define any of the event notification methods. That is left to the subclasses of this interface class. Thus, this interface class defines all of the constants used to register interest in an event and provides a common parent class to all of the event-related interfaces.

g. SmProcessConfig Class

This is an abstract base class that contains the configuration information for a particular class of server process to be implemented. There must be an instance of this class (that is, a subclass member) for each type of operating system platform to be supported. Thus, each object of the SmServerImpl class has a pointer to one SmProcessConfig object. Such subclasses will have information that is specific to the particular operating system that server process will be running in. Each subclass also will have get and set methods for view support to display the configuration information.

Thus, members of this class include methods that initialize the base contents of each new SmProcessConfig object, methods that construct new SmProcessConfig objects for specified platforms, process methods for user viewing of configuration changes, methods for configuration change validation, and methods for updating view item values to reflect the current state of objects being represented.

h. Remote Classes

FIG. 5 shows a string of inheritance relationships that relate to remote objects and methods, including GFRemote, AllowRemote, and Remote. These classes provide an interface for the system to support remote objects and methods, so that remote subclasses can remotely invoke methods of local parent classes.

6. Processing of the Extended Framework

The framework user/program developer will utilize the class and method definitions, as described above, with appropriate extensions and overrides, to produce a desired server program. Thus, as is the case with object oriented programming principles, details of the extended framework processing will depend on the particular extensions implemented by the framework user. Nevertheless, the processing enabled by the framework can be described in terms of the classes and methods defined by the present invention. Particular processing tasks performed by classes of the extended system can be described in a step-wise, procedural fashion. The following description, therefore, should be understood to apply to the operating steps performed by the extended framework. Those skilled in the art, however, will understand that the flow of processing is not necessarily sequential through the flow diagram boxes, as objects will perform processing in accordance with their attributes and methods. The framework classes define server functions and network configurations, track user configuration changes, and communicate system operations to the computer user.

Figure 6A:
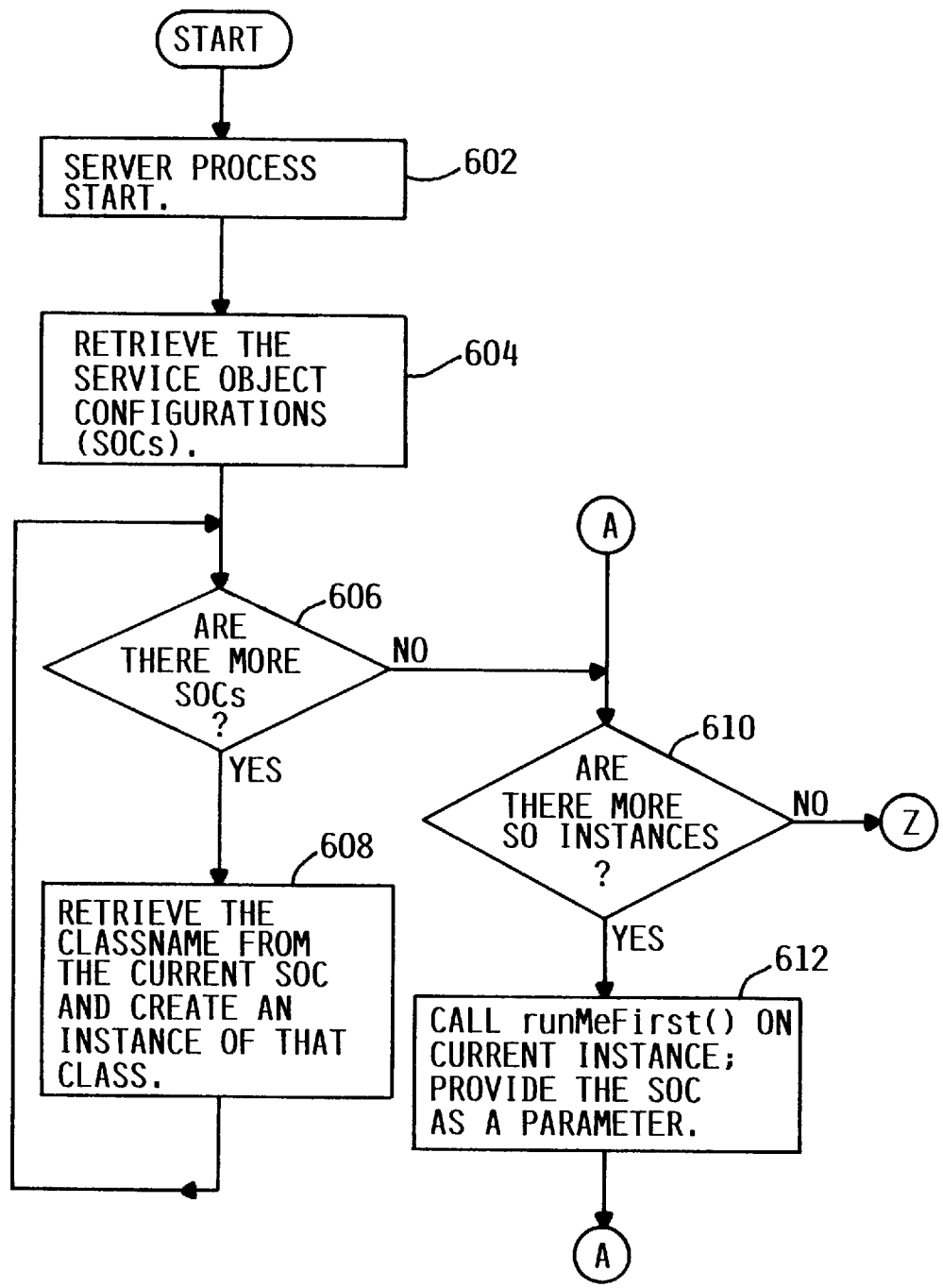
FIG. 6 is a flow diagram representation of the processing carried out by the Server category illustrated in FIG. 4.
Figure 6B:
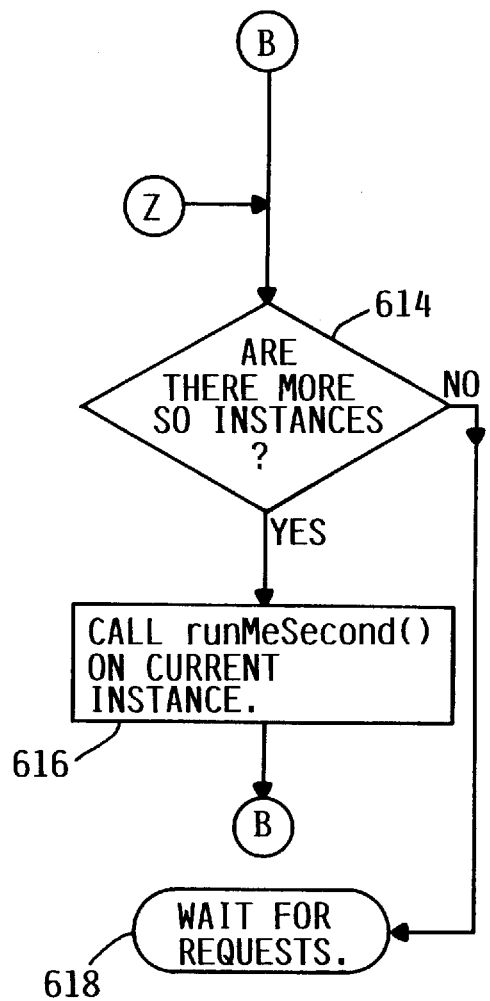
Figure 7A:
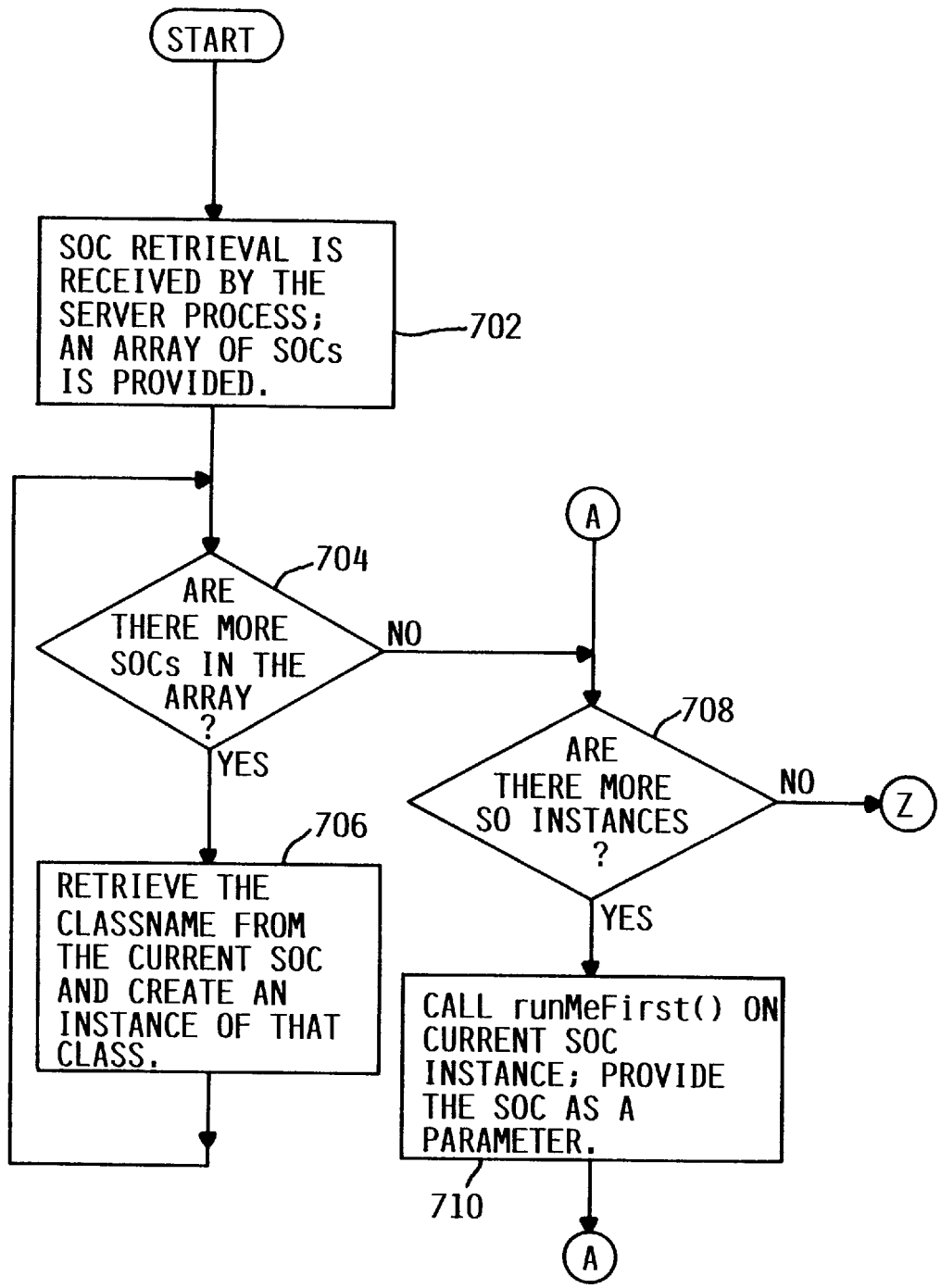
FIG. 7 is a flow diagram representation of the processing carried out by the ServiceObject category illustrated in FIG. 5.
Figure 7B:
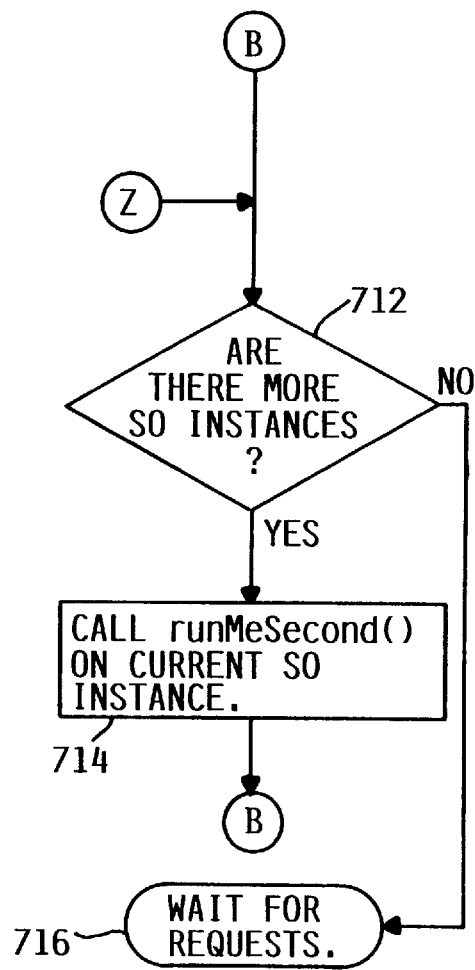

The processing of the extended framework is illustrated by the flow diagrams of FIG. 6 and FIG. 7. FIG. 6 is a flow diagram representation of the processing carried out by the Server category, and FIG. 7 is a flow diagram representation of the processing carried out by the ServiceObject (SO) category.

In the flow diagrams, the server process is the Server program process that provides the operating environment in which the SO objects exist and is directly visible to the host operating system. That is, the Server program is a running program. Server program and server process will be used interchangeably to refer to the extended framework. The end user directly or indirectly starts the server process when any of the server functions are desired to be available. The SO objects are contained within the server process. The server process provides server management features such as starting and stopping the server process, starting and stopping specific SO objects, dynamic tuning of server process resources such as memory and process threads, and other functions related to the server process itself.

The SO object is the encapsulation of the logic that provides specific server services, such as print serving, file serving, mail serving, security, transaction processing, and the like. The SO objects must have an associated ServiceObjectConfiguration (SOC) object and must provide the RunMeFirst( ) and RunMeSecond( ) methods that will be called during their instantiation. One important aspect of the SO objects is that they provide only the logic concerning the specific service they perform, they implement none of the underlying server management logic, which is handled by the server process.

The SOC object is a data-only object. That is, the SOC object contains little or no logic, but rather contains data that is used by other objects. The SOC object has two primary uses: (1) it contains information that is used by the server process when instantiating the SO objects and will contain at least the class name (className object) of the SO object; and (2) the SOC may optionally contain configuration information used by the SO object, such as directory names, printer names, file names, passwords, and the like. The server process ignores the SO-specific information that may be contained in the SOC object.

a. Operation of the Server category: Server Process Startup.

The server program to be generated from the framework is intended to help manage the client/server interface of a distributed system and efficiently supervise the sharing of system computing resources. Before the server process is started, a program administrator must perform some configuration setup, which is represented by the START box of the FIG. 6 flow diagram. Such setup will include at least indicating what SO objects are associated with specific server processes. The setup performance may also involve providing configuration information necessary for specific SO objects, such as file names, printer names, passwords, and the like, as appropriate for individual SO objects. Other than the need to indicate which SO objects reside in each server process, the configuration setup details will depend on the configuration of the computer system on which the server framework is to be used and will be understood by those skilled in the art without further explanation.

The start of the server process is represented in FIG. 6 by the flow diagram box numbered 602. The details of starting the process will depend on the operating environment of the computer system, but will usually involve running a program that implements the server process. Once running, the server process retrieves all service object configuration objects (SOCs) for the SO objects with which it has been associated. The server process uses the className attribute in each SOC to determine the class that represents the SO object and thus should be instantiated. This processing is represented by the flow diagram box numbered 604.

Next, the server process will loop through each of the SOC objects with which it is associated, as indicated by the decision box numbered 606 and resulting program flow. That is, at the decision box numbered 606, the server process checks to determine if there are SOC objects remaining to process. If there is an SOC object to be processed, an affirmative outcome at the box 606, then the server process retrieves a class name and constructs an instance of that class (box 608). The reference to the newly created SO object is saved for use with the runMeFirst( ) and runMeSecond( ) methods. If there are no more SOC objects to process, a negative outcome at the decision box 606, then processing proceeds to checking for SO instances at the decision box numbered 610.

At the decision box 610, the server process will loop through each of the SO objects just created. That is, at the decision box numbered 610, the server process checks to determine if there are SO objects remaining to process. If there is an SO object to be processed, an affirmative outcome at the box 610, then at the box numbered 612 the server process calls the runMeFirst( ) method on the SO object and provides the SOC (Service Object Configuration object) for the SO as a parameter, because the SO could be using the SOC to provide necessary customization information. This method call will permit the SO object to resolve any interdependencies that it may have with other SO objects that are currently being instantiated.

For example, if an SO object "A" and an SO object "B" are associated with the server process and "A" uses "B" while making itself ready for operation, then "B" can probably fully create itself during its object instantiation. The SO object "A" will perform as much initialization as it can during its construction, but must wait until its runMeFirst( ) method call to do anything that requires "B", since that would be the earliest that it can assume "B" exists and is ready to perform work. Thus, interdependencies are resolved when all objects having methods or information used by other objects are instantiated and operational. If there are no more SO objects to process, a negative outcome at the decision box 610, then the server process proceeds to runMeSecond( ) processing at the decision box numbered 614.

For each SO object remaining to be processed, an affirmative outcome at the decision box 614, the server process calls the runMeSecond( ) method, as represented by the flow diagram box numbered 616. This method call will let SO objects having more complex interdependencies initialize themselves in a stepwise fashion. It should be understood that additional "runMeX( )" methods can be called if SO objects have extremely complicated interdependencies to resolve. Two "runMeX( )" methods are described herein because at least two are needed to resolve a minimal level of SO object interdependency. If no more SO objects remain to be processed and if all interdependencies have been resolved, a negative outcome at the decision box numbered 614, then processing proceeds to the flow diagram box numbered 618.

At the flow diagram box numbered 618, all of the SO objects will have been instantiated and initialized, ready to provide the services for which they were designed. Next, whenever the services of a particular SO class object that was not created during server process startup (as just detailed), or that has been previously stopped, are needed, the SO object will be dynamically instantiated and its processing started, as described further below. The way in which an SO object makes itself available to clients and the way in which a client becomes connected with a specific SO object follows standard, conventional client/server infrastructure that will be understood by those skilled in the art without further explanation. The server process itself waits to handle any server management instructions that may be sent to it, such as stopping the server. One instruction the server process is ready to handle involves the next aspect of the framework operation, dynamically starting an SO object, which is described below in conjunction with FIG. 7.

b. Dynamic SO Object Creation.

As noted above for FIG. 6, certain configuration setup functions must be performed in accordance with the computer system on which the server process is operating. These setup functions are incorporated within the START box of FIG. 7. Moreover, the server process within which the SO objects exist must already be running and operational before FIG. 7 processing may begin.

At the flow diagram box numbered 702, the startServiceobject( ) method is sent to the server process. This method provides an array of SOC objects for the SO objects that should be started in the server process. Next, at the decision box numbered 704, the server process will loop through each of the SOC objects in the array provided with the startServiceObject( ) method. That is, if there are more SOC objects, an affirmative outcome at the decision box, then the server process will retrieve the className attribute from the SOC currently being processed and create an instance of it. This processing is represented by the flow diagram box numbered 706. If there are no more SOC objects to process, a negative outcome at the decision box 704, then processing proceeds to the SO instances at the decision box numbered 708.

At the decision box 708, the server process will loop through each of the SO objects to call the respective runMeFirst( ) methods. Thus, at the decision box 708, the server process checks to determine if there are SO objects to process. If there are SO objects remaining to process, an affirmative outcome, then the server process provides the SOC for the SO object as a method parameter, since the SO object could be using the SOC to provide necessary customization information. This method call is represented by the flow diagram box numbered 710 and will permit the SO object to resolve any interdependencies that it may have with other SO objects that are currently being instantiated. As with the example above for the server process startup, each SO object will perform as much initialization as it can during its construction, but must wait until its runMeFirst( ) method call to do anything that requires another SO object, an object with which it has an interdependency, as that would be the earliest that it can assume the other object exists and is ready to perform work. If there are no more SO objects to process, a negative outcome at the decision box 708, then the server process proceeds to runMeSecond( ) processing at the decision box numbered 712.

For each SO object remaining to be processed, an affirmative outcome at the decision box 712, the server process calls the runMeSecond( ) method, as represented by the flow diagram box numbered 714. This method call will let SO objects having more complex interdependencies initialize themselves in a stepwise fashion. As described above for the server startup, it should be understood that additional "runMeX( )" methods can be provided and called if SO objects have extremely complicated interdependencies to resolve. If no more SO objects remain to be processed and if all interdependencies have been resolved, a negative outcome at the decision box numbered 712, then processing proceeds to the flow diagram box numbered 716.

At the flow diagram box numbered 716, all of the SO objects will have been instantiated and initialized, ready to provide the services for which they were designed. Again, the way in which an SO object makes itself available to clients and the way in which a client becomes connected with a specific SO object follows standard, conventional client/server infrastructure that will be understood by those skilled in the art without further explanation. The server process itself waits to handle any server management instructions that may be sent to it. At the processing represented by the flow diagram box numbered 716, the server process is ready to perform all of the server functions for which the framework adopter has provided, and merely waits for the next server call.

ADVANTAGES OF THE INVENTION

Thus, the reusable framework of the invention provides a set of objects that perform server functioning and permit a framework user to add extensions to the framework for specific processing features, thereby producing a server program for performing server processing in an operating system. A server program developer can thereby more quickly conclude program development and maintain programs with updates and improvements. The developer must provide the end-user interface, which establishes a means for the end-user to communicate with the program to receive and process the server functions. The program developer is thereby free to concentrate on program features, building upon the framework.

We claim:

1. A computer data processing system comprising:
   a central processing unit;
   a user interface; and
   a main memory having an operating system that supports an object oriented programming environment containing a framework that provides an extensible server process that includes a Server object category and a Service Object (SO) class of cooperating objects that perform predetermined functions of the server process, wherein the Server object retrieves system configuration information, determines the SO objects that must be instantiated, and resolves interdependencies of the SO objects.

2. A computer data processing system as defined in claim 1, wherein the SO objects include a first-executed method and a second-executed method that perform SO startup processing.

3. A computer data processing system as defined in claim 2, wherein the Server object determines SO objects to be dynamically instantiated by retrieving data from Service Object Configuration (SOC) objects.

4. A computer data processing system as defined in claim 3, wherein the Server object retrieves data from a different SOC object for each SO object to be instantiated.

5. A computer data processing system as defined in claim 2, wherein the Server object calls the first-executed method on each of the SO objects instantiated and provides the corresponding SOC object information as a parameter, and then calls the second-executed method on each of the SO objects instantiated to resolve any interdependencies among the SO objects.

6. A computer data processing system as defined in claim 5, wherein an SO object corresponding to a server function to be performed provides an array of SOC objects whose operation is to be started to provide the server function.

7. A computer data processing system as defined in claim 6, wherein the Server object calls a startup method on each SOC object in the array to start the respective SO object processing and provide the server function to be performed.

8. A computer data processing system as defined in claim 7, wherein the startup method called by the Server object calls the first-executed method on each of the SO objects named in the SOC object array and then calls the second-executed method on each of the SO objects named in the SOC object array.

9. An object oriented extensible server program framework for use in a computer system having an operating system that supports an object oriented programming environment and includes a memory in which cooperating objects comprising object classes can be stored, the framework providing an extensible server program for the computer system and further including:
   a Service Object (SO) class of cooperating objects that perform predetermined functions of the server process; and
   a Server object that retrieves system configuration information, determines the SO objects that must be instantiated, and resolves interdependencies of the SO objects.

10. A framework as defined in claim 9, wherein the SO objects include a first-executed method and a second-executed method that perform SO startup processing.

11. A framework as defined in claim 10, wherein the Server object determines SO objects to be dynamically instantiated by retrieving data from Service Object Configuration (SOC) objects.

12. A framework as defined in claim 11, wherein the Server object retrieves data from a different SOC object for each SO object to be instantiated.

13. A framework as defined in claim 10, wherein the Server object calls the first-executed method on each of the SO objects instantiated and provides the corresponding SOC object information as a parameter, and then calls the second-executed method on each of the SO objects instantiated to resolve any interdependencies among the SO objects.

14. A framework as defined in claim 13, wherein an SO object corresponding to a server function to be performed provides an array of SOC objects whose operation is to be started to provide the server function.

15. A framework as defined in claim 13, wherein the Server object calls a startup method on each SOC object in the array to start the respective SO object processing and provide the server function to be performed.

16. A framework as defined in claim 15, wherein the startup method called by the Server object calls the first-executed method on each of the SO objects named in the SOC object array and then calls the second-executed method on each of the SO objects named in the SOC object array.

17. A program product data storage device, tangibly embodying a program of machine-readable instructions executable by a computer system having an operating system that supports an object oriented programming environment, the program product comprising:
   a recordable media; and
   a framework recorded on the recordable media, the framework providing an extensible server program for the computer system and further including
   a Service Object (SO) class of cooperating objects that perform predetermined functions of the server process, and
   a Server object that retrieves system configuration information, determines the SO objects that must be instantiated, and resolves interdependencies of the SO objects.

18. A program product as defined in claim 17, wherein the SO objects include a first-executed method and a second-executed method that perform SO startup processing.

19. A program product as defined in claim 18, wherein the Server object determines SO objects to be dynamically instantiated by retrieving data from Service Object Configuration (SOC) objects.

20. A program product as defined in claim 19, wherein the Server object retrieves data from a different SOC object for each SO object to be instantiated.

21. A program product as defined in claim 19, wherein the Server object calls the first-executed method on each of the SO objects instantiated and provides the corresponding SOC object information as a parameter, and then calls the second-executed method on each of the SO objects instantiated to resolve any interdependencies among the SO objects.

22. A program product as defined in claim 21, wherein an SO object corresponding to a server function to be performed provides an array of SOC objects whose operation is to be started to provide the server function.

23. A program product as defined in claim 21, wherein the Server object calls a startup method on each SOC object in the array to start the respective SO object processing and provide the server function to be performed.

24. A program product as defined in claim 23, wherein the startup method called by the Server object calls the first-executed method on each of the SO objects named in the SOC object array and then calls the second-executed method on each of the SO objects named in the SOC object array.

25. A method of distributing a program product, the method comprising the steps of:

establishing a connection between a first computer system and a second computer system; and transmitting the program product from the first computer system to the second computer system, wherein the program product comprises an object oriented framework providing an extensible server program for the computer system and further including a Service Object (SO) class of cooperating objects that perform predetermined functions of the server process, and a Server object that retrieves system configuration information, determines the SO objects that must be instantiated, and resolves interdependencies of the SO objects.

26. A method as defined in claim 25, wherein the SO objects of the transmitted program product include a first-executed method and a second-executed method that perform SO startup processing.

27. A method as defined in claim 26, wherein the Server object determines SO objects to be dynamically instantiated by retrieving data from Service Object Configuration (SOC) objects.

28. A method as defined in claim 27, wherein the Server object retrieves data from a different SOC object for each SO object to be instantiated.

29. A method as defined in claim 27, wherein the Server object calls the first-executed method on each of the SO objects instantiated and provides the corresponding SOC object information as a parameter, and then calls the second-executed method on each of the SO objects instantiated to resolve any interdependencies among the SO objects.

30. A method as defined in claim 29, wherein an SO object corresponding to a server function to be performed provides an array of SOC objects whose operation is to be started to provide the server function.

31. A method as defined in claim 29, wherein the Server object calls a startup method on each SOC object in the array to start the respective SO object processing and provide the server function to be performed.

32. A method as defined in claim 31, wherein the startup method called by the Server object calls the first-executed method on each of the SO objects named in the SOC object array and then calls the second-executed method on each of the SO objects named in the SOC object array.

* * * * *